(12) United States Patent
Kumar

(10) Patent No.: US 7,278,447 B2
(45) Date of Patent: Oct. 9, 2007

(54) CO-AXIAL SOLENOID ACTUATOR

(76) Inventor: Viraraghavan S. Kumar, 1416 Dorset Pl., Melbourne, FL (US) 32940

( * ) Notice: Subject to any disclaimer, the term of this patent is extended or adjusted under 35 U.S.C. 154(b) by 364 days.

(21) Appl. No.: 11/002,689

(22) Filed: Dec. 1, 2004

(65) Prior Publication Data

US 2005/0115618 A1    Jun. 2, 2005

Related U.S. Application Data

(60) Provisional application No. 60/526,424, filed on Dec. 1, 2003.

(51) Int. Cl.
*F16K 31/02* (2006.01)
*F17D 1/00* (2006.01)

(52) U.S. Cl. .............. 137/613; 251/129.1; 251/129.21; 335/256; 335/266; 335/268

(58) Field of Classification Search .......... 251/129.15, 251/129.09, 129.1, 129.21; 137/613; 335/256, 335/266, 268
See application file for complete search history.

(56) References Cited

U.S. PATENT DOCUMENTS

| | | | |
|---|---|---|---|
| 4,172,471 A | 10/1979 | Bjorklund | 137/887 |
| 4,643,223 A | 2/1987 | Abe et al. | 137/554 |
| 4,678,160 A | 7/1987 | Yamada et al. | 251/129.02 |
| 5,179,970 A | 1/1993 | Jarocki et al. | 137/9 |
| 5,228,597 A | 7/1993 | Low | 220/129.1 |
| 5,458,151 A | 10/1995 | Wass | 137/613 |
| 5,529,281 A * | 6/1996 | Brudnicki et al. | 251/129.21 |
| 6,098,644 A | 8/2000 | Ichinose | 137/1 |
| 6,161,572 A | 12/2000 | Credle et al. | 137/504 |
| 6,209,580 B1 | 4/2001 | Foster | 137/596.12 |
| 6,311,947 B1 | 11/2001 | Foster | 251/43 |
| 6,478,200 B1 | 11/2002 | Davis | 222/504 |
| 6,561,217 B1 | 5/2003 | Pan | 137/487.5 |
| 6,968,859 B1 * | 11/2005 | Nagano et al. | 251/129.1 |

* cited by examiner

*Primary Examiner*—Kevin Lee
(74) *Attorney, Agent, or Firm*—The Bilicki Law Firm, P.C.

(57) ABSTRACT

An actuator assembly comprised of: a first coil and a second coil, each with a bore and a producing a magnetic flux when subject to an electric signal; a tube extending through the bores such that coils are coaxial; a magnetic pole piece within the tube and generally between the first bore and the second bore; a magnetic ring set outside of the tube and between the coils, in which the magnetic flux paths both travel through the magnetic pole piece and the magnetic ring to complete their respective magnetic paths; and a first and second axially translatable movable member within the tube and wherein the movable members each axially translate towards the magnetic pole piece in the presence of the magnetic flux such that by controlling the electric signal, proportionality can be achieved.

47 Claims, 12 Drawing Sheets

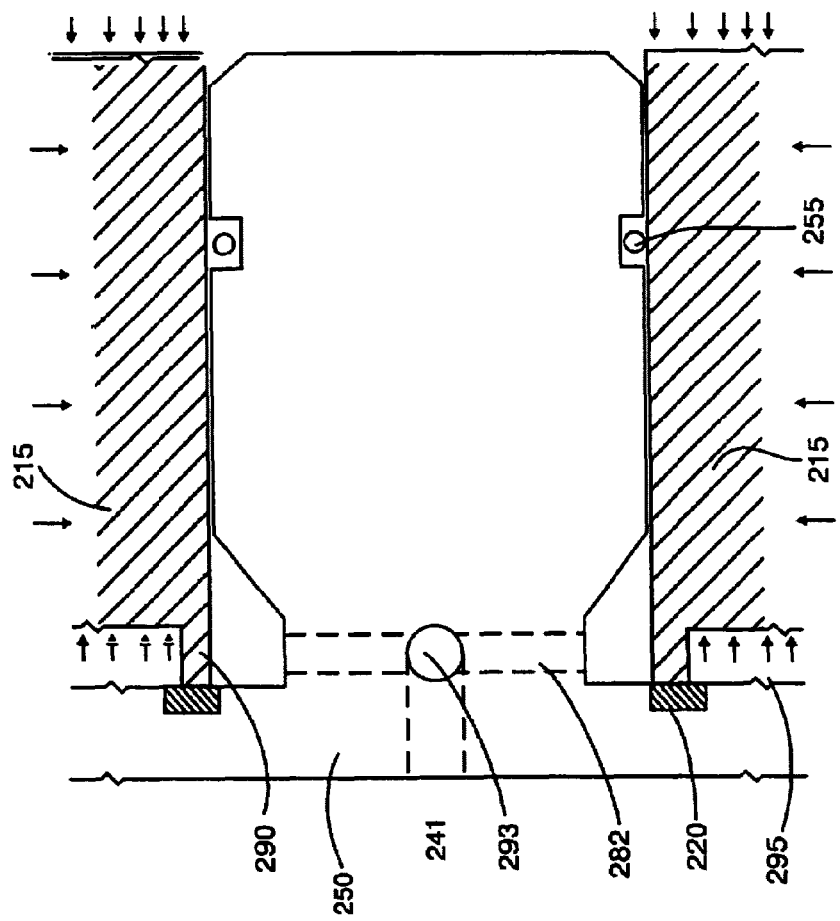

FIGURE 9
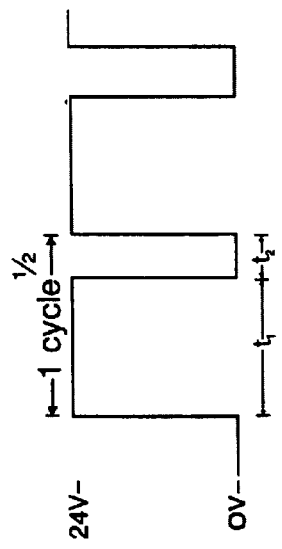
Figure 9a
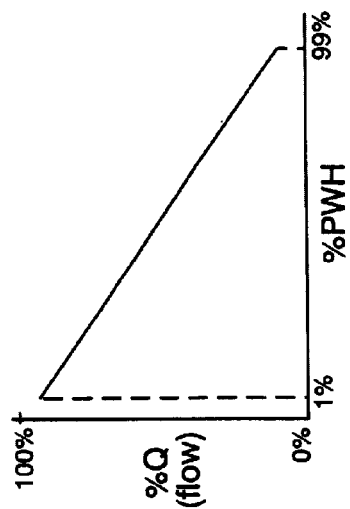
Figure 9b

CO-AXIAL SOLENOID ACTUATOR

CROSS-REFERENCE TO RELATED APPLICATION

This application claims priority to provisional U.S. application Ser. No. 60/526,424, filed Dec. 1, 2003 and of the same title, incorporated herein in its entirety.

FIELD OF INVENTION

This invention relates generally to a proportional solenoid-controlled actuator. More particularly, but not by way of limitation, the invention relates to a fluid actuator that combines a pulse width modulation portion with an on/off portion in series to effectively operate as a proportional solenoid-controlled actuator.

BRIEF DESCRIPTION OF THE DRAWINGS

FIG. 8 shows one embodiment of the second end cap on the on/off portion of the device and the fluid forces acting on the second movable member.

FIG. 9a shows an example of an energy curve for the PWM portion of the device.

FIG. 9b shows the relationship between percent modulation and flow in the PWM portion of the device.

DETAILED DESCRIPTION OF EMBODIMENTS OF THE INVENTION

Figure 1:
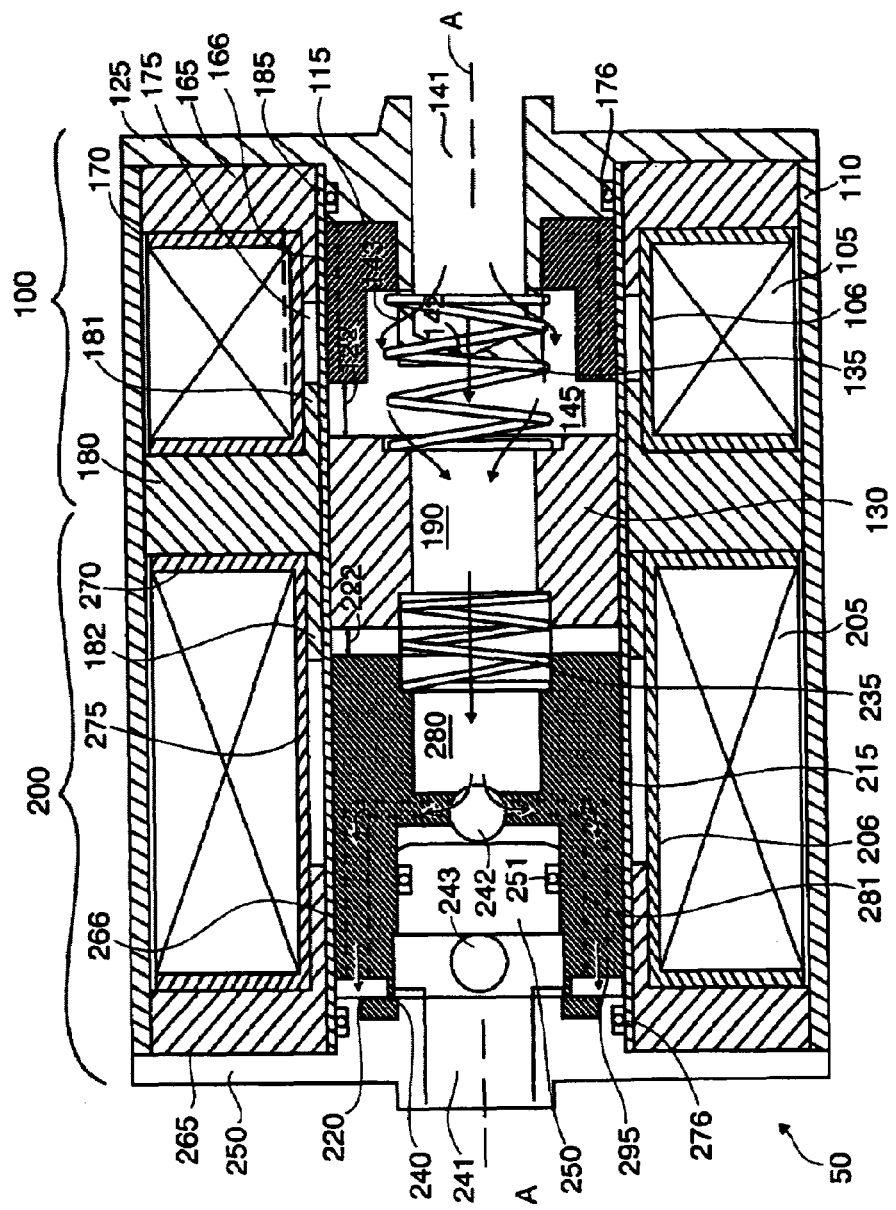
FIG. 1 shows one embodiment of the entire device.

While the device is susceptible to various alternative forms and modifications, specific embodiments will be shown by way of example in the drawings and will be described in detail herein. However, it should be understood that the invention is not intended to be limited to the particular embodiments disclosed. Rather, it is intended that the invention covers all modifications, equivalents, and alternatives following within the spirit and scope of the invention as defined by the claims. Moreover, while the drawings depict the device being used in a valve assembly, it is intended that the device can be used in other applications, as will be discussed infra.

Furthermore, with reference to the drawings, the reader should understand that like reference numerals in different drawings refer to the like elements and components of the invention. Moreover, it should be noted that each embodiment of the invention is not depicted by the figures.

The term "fluid" is used herein to describe any substance with a flow capable of being controlled by a valve, be it a gas or liquid.

The device is an actuator generally comprised of two portions in fluid communication with one another: a pulse width modulation valve portion (hereinafter "PWM portion") and an on/off portion, in series and co-axial with one another. Although neither portion is a proportional actuator per se, the two portions operate together to produce, in effect, a proportional-type actuator.

FIG. 1 shows one embodiment of the entire assembly 50 in which the two general portions can be appreciated: PWM portion 100 and on/off portion 200. Valve assembly 50 is comprised of: first coil 105 wound on first bobbin 170 and with first coil bore 106 therethrough; second coil 205 wound on second bobbin 270 and with a second coil bore 206 therethrough; tube 185 extending through coil bores 106, 206 such that first coil 105 and second coil 205 are co-axial; magnetic pole piece 130 disposed within tube 185 and generally centrally located within tube 185 and generally between first coil bore 106 and second coil bore 206; magnetic ring 180 disposed around tube 185 and generally between first coil 105 and second coil 205; first end cap 125 generally adjacent to first coil 105 and defining inlet port 141, but on the generally opposite side of first coil 105 as magnetic ring 180; second end cap 250 adjacent to second coil 205 and defining outlet port 241, but on the generally opposite side of second coil 205 as magnetic ring 180; first movable member 115 within tube 185, between first end cap 125 and magnetic pole piece 130, and forming first axial gap 122 between first movable member 115 and magnetic pole piece 130; second movable member 215, also within tube 185, but located between second end cap 250 and magnetic pole piece 130 and forming second axial gap 222 between second movable member 215 and magnetic pole piece 130; first biasing member 135 between first movable member 115 and magnetic pole piece 130; and second biasing member between second movable member 215 and magnetic pole piece 130.

Figure 2:
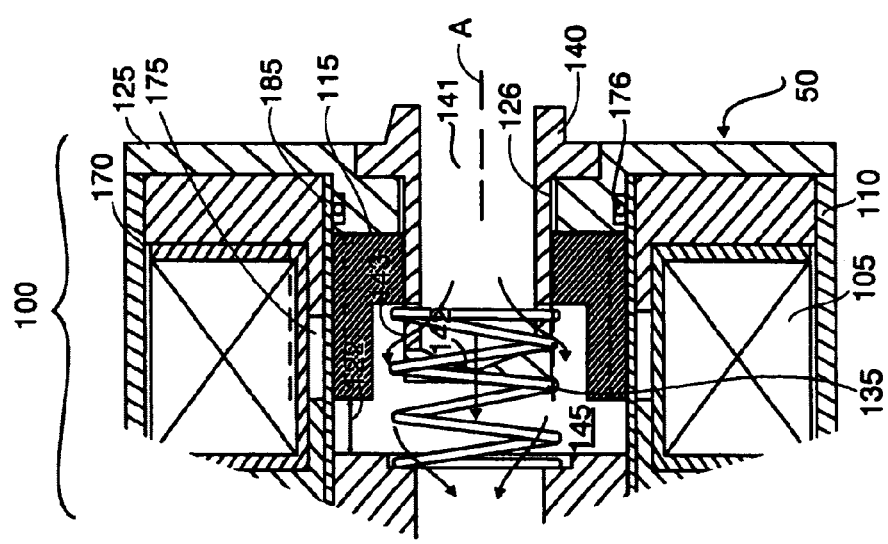
FIG. 2 shows the PWM portion of the device with a two-piece construction of the end cap, including a fluid entrance fitting.

As stated previously, the device is susceptible to various alternative forms and modifications, and the description of the device is intended to encompass all modifications, equivalents, and alternatives following within the spirit and scope of the invention as defined by the claims. For example, in the embodiment shown, end cap 125 of PWM portion 100 defines fluid entry port 141 at one end and further includes axial hole 142 and one or more radial holes 143 at the other end disposed within assembly 50. In one embodiment, there are four radial holes 143 spaced 90° from one another relative to axis A. As shown, end cap 125 is made of one piece, but end cap 125 could be made of multiple pieces. FIG. 2 shows PWM portion 100 with the two-piece construction, with end piece 125 having generally centered aperture 126 and fluid entrance fitting 140 disposed in aperture 126 and defining fluid entry port 141, axial hole 142, and one or more radial holes 143.

Referring again to FIG. 1, first movable member 115 is free-floating within chamber 145, which is created by first end cap 125, tube 185, and magnetic pole piece 130, except that first biasing member 135 holds first movable member 115 against first end cap 125 which allows the fluid to surround first movable member 115. In this embodiment, biasing member 135 is a spring, but other biasing mechanisms could be employed such as a flexible tube, a star spring with a memory, a sponge, a geo-spring, fluid pressure, gravity, or any other means for biasing first movable member 115 towards end cap 125. Moreover, in addition to placing first biasing member between magnetic pole piece 130 and first movable member 115, which pushes first movable member 115 against first end cap 125, a spring or other biasing mechanism can be placed between first movable member 115 and first end cap 125, attached to both, which pulls first movable member 115 away from magnetic pole piece 130. In addition, the biasing mechanism could be manual translation. In an embodiment in which fluid pressure is used as the biasing mechanism, first movable member 115 would not be completely surrounded by the fluid, but would be configured so that the fluid exerts a net force in the direction of first end cap 125.

Figure 3:
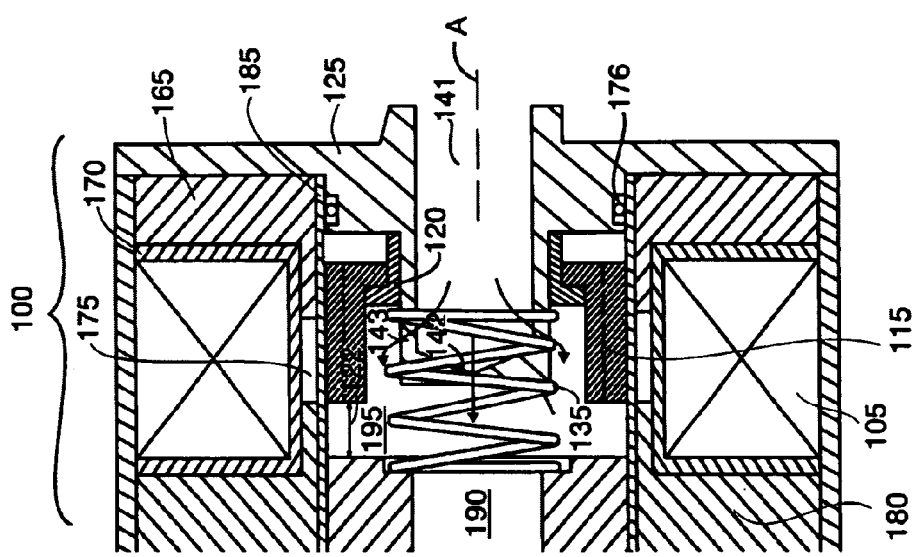
FIG. 3 shows an alternate embodiment of the movable member of the PWM portion, further including a movable member insert.
Figure 4:
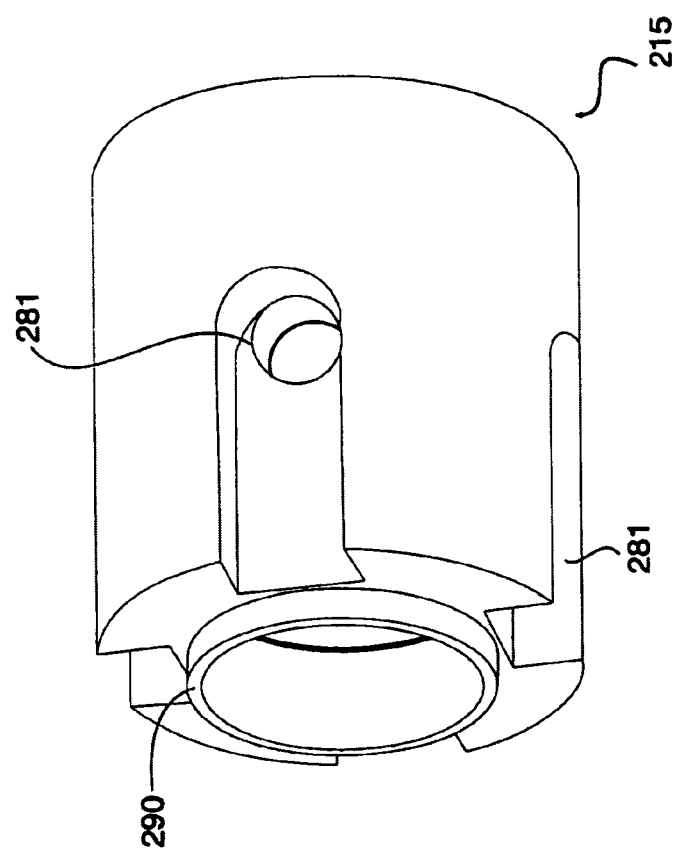
FIG. 4 shows a three-dimensional perspective view of one embodiment of the second movable member.

Furthermore, as compared to the embodiment shown in FIG. 1, first movable member 115 can further include movable member insert 120, as can be seen in FIG. 3. Movable member insert 120 partially surrounds first movable member 115 to make axial translation of first movable member 115 smoother by reducing friction between it and the other components of assembly 50. If movable member insert 120 is on the inside of first movable member 115 (as shown in FIG. 3), movable member insert 120 reduces friction between first movable member 115 and that portion of first end cap 125 (or the fluid entrance fitting if a two-piece first end cap 125 is used, as in the embodiment of the invention shown in FIG. 2) which defines axial hole 142 and radial holes 143. However, movable member insert 120 could also be on the outside of first movable member 115, between first movable member 115 and tube 185, reducing friction therebetween. Furthermore, movable member insert 120 could partially surround first movable member 115 so that it is both between first movable member 115 and tube 185 and between first moveable member 115 and end cap 125 to provide smoother transition. Movable member insert 120 can be made of plastic, Teflon®, fluorocarbons, nylon, or any other material that decreases friction and provides smoother axial translation of first movable member 115. An insert could also similarly be attached to second movable member 215 of on/off portion 200, though not shown in any of the figures. FIG. 4 shows a three-dimensional perspective view of one embodiment of second movable member 215.

Also visible in the embodiment shown in FIG. 1 are fluid sealing members 176 and 276, in the PWM portion 100 and on/off portion 200, respectively, which prevent fluid from leaking out of assembly 50, though which are not necessary elements. In this embodiment, fluid sealing member 176, 276 are O-rings, but can also be plumber's tape, silicone, a sealing material (e.g., Lock-Tite™), or the components can be welded together.

The embodiment shown in FIG. 1 also includes housing 110. However, one of ordinary skill in the art will readily realize that assembly 50 can be constructed without housing 110, as will be discussed in greater detail infra.

As can be seen, the embodiment of assembly 50 shown in FIG. 1 includes first end piece 165. Also visible in this embodiment on PWM portion 100 is relatively thin ferrule-shaped portions 166, 181 of both first end piece 165 and magnetic ring 180, respectively, both of which extend at least partially between first bobbin 170 and tube 185, but are separated by first gap 175. Similarly, in the embodiment of on/off portion 200 shown in FIG. 1, second end piece 265 can be appreciated. In this embodiment, second end piece 265 and magnetic ring 180 also include ferrule-shaped portions 266, 182, respectively, which extend partially between second bobbin 270 and tube 185, but are separated by second gap 275. The purpose of first and second gaps 175, 275 will be explained infra.

Figure 5:
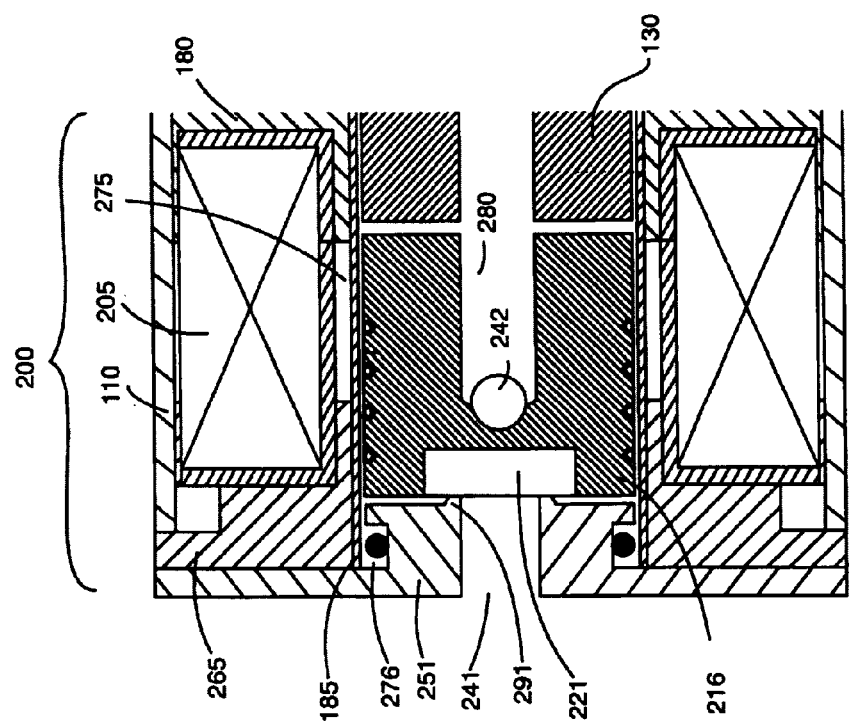
FIG. 5 shows an unbalanced design of an alternate embodiment of the on/off portion of the device.

FIG. 5 shows an unbalanced design of an alternate embodiment of on/off portion 200, which includes second coil 205 within housing 110, magnetic ring 180 and second end piece 265 separated by second gap 275, magnetic pole piece 130, tube 185, and fluid sealing member 276, but does not show the side bores (element 281 in FIG. 1, described in detail infra). However, in this embodiment, on/off portion 200 includes alternate embodiment of second movable member 216 with molded seal 221 and end cap 251. Although second moveable member 216 is still axially translatable between end cap 251 and magnetic pole piece 130, molded seal 221 is disposed on second movable member 216 instead of on end cap 251, and end cap 251 has annular portion 291 that abuts molded seal 221 on second movable member 216 when, as shown, in the closed position with second coil 205 de-energized. As will be explained in more detail, with the embodiments shown in FIGS. 7a-7d (infra), when second coil 205 is energized, second movable member 216 translates toward magnetic pole piece 130, and the fluid is able to pass between molded seal 221 of second movable member 216 and annular portion 291 of end cap 251 and exit assembly 50 via fluid exit port 241.

Figure 6:
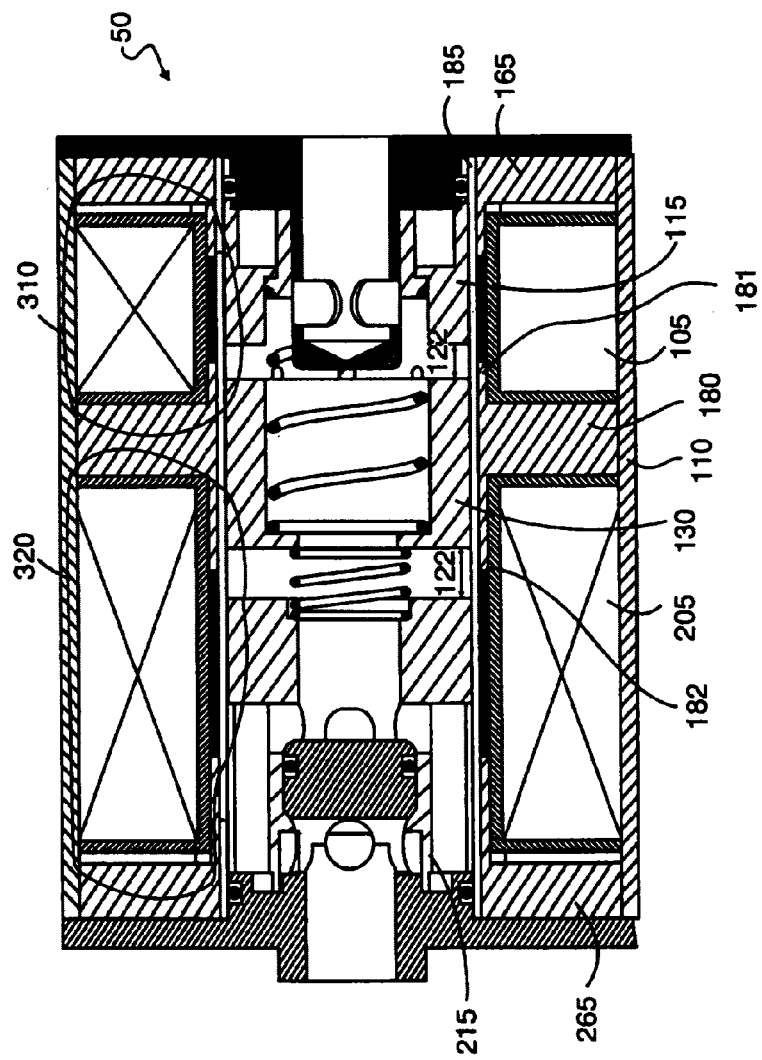
FIG. 6 shows the magnetic flux paths as they pass through one embodiment of the device.

When subject to an electric signal, first coil 105 and second coil 205 each produce a magnetic flux. As can be seen in FIG. 6, which shows the same embodiment of assembly 50 as shown in FIG. 1, the magnetic flux created by first coil 105 follows first magnetic flux path 310, which travels through housing 110, through first end piece 165, jumps tube 185, through first movable member 115, splits into two paths, the first path again jumps tube 185 to ferrule-shaped portion 181 of magnetic ring 180, and the second path jumps first axial gap 122 to magnetic pole piece 130 and then jumps tube 185 to magnetic ring 180, the two paths re-joining and passing through magnetic ring 180 and travelling again to housing 110, completing the circuit.

The magnetic flux created by second coil 205 also completes a circuit, in which second magnetic flux path 320 travels from housing 110, through second end piece 265, jumps tube 185 to second movable member 215, splits into two paths in which the first path jumps second axial gap 222 to magnetic pole piece 130 and then jumps tube 185 to magnetic ring 180, and the second path jumps tube 185 to ferrule-shaped portion 182 of magnetic ring 180, the paths rejoining in magnetic ring 180, and passing through it to housing 110, completing this second circuit. Both first magnetic flux path 310 and second magnetic flux path 320 travel through the same magnetic pole piece 130 and magnetic ring 180, but are independent of one another.

As can be seen in FIG. 1, first axial gap 122, between first movable member 115 and magnetic pole piece 130, is entirely within first coil bore 106 of first coil 105. If assembly 50 is constructed with first axial gap 122 either wholly or partially outside of first coil bore 106, a significant portion of the magnetic flux might jump tube 185 and not cross first axial gap 122 at all (or to a very limited degree), the importance of which will be discussed infra. However, if assembly 50 is constructed with first axial gap 122 at least partially inside of first coil bore 106, the magnetic flux will still jump the first axial gap 122, though will be less efficient, requiring more energy to have sufficient magnetic flux cross first axial gap 122. Thus, the more that the first axial gap 122 is extended outside of first coil bore 106 (or, entirely outside of first coil bore 106 ), the greater amount of energy will be required for assembly 50 to ensure that there is a sufficient attractive force between first movable member 115 and magnetic pole piece 130, and ensure proper operation of assembly 50.

The location of second axial gap 222, between second movable member 215 and magnetic pole piece 130 is also shown in FIG. 1 to be entirely within second coil bore 206 of second coil 205. Similar to that of first axial gap 122, the placement of second axial gap 222 within second coil bore 206 increases the efficiency of on/off portion 200 of assembly 50, but could be situated partially or wholly outside of second coil bore 206.

As shown in FIG. 1, the common magnetic pole piece 130 is also partially protruding into each coil bores 106, 206. Similar to the discussion relating to the placement of axial gaps 122, 222, positioning magnetic pole piece 130 partially within each coil bore 106, 206 increases efficiency by ensuring that sufficient magnetic flux jumps first and second axial gaps 122, 222 rather than entirely jumping tube 185.

With respect to placement of components within coil bores 106, 206, first and second movable members 115, 215 are located almost entirely within the respective coil bores 106, 206 as well. As with the discussion with respect to first and second axial gaps 122, 222, positioning first movable member 115 within first coil bore 106 and second movable member 215 within second coil bore 206 increases efficiency of PWM portion 100 and on/off portion 200, respectively, by requiring less energy to create sufficient magnetic flux to pass between first and second movable members 115, 215 and magnetic pole piece 130. However, first movable member 115 and/or second movable member 215 can also be partially or wholly outside of coil bores 106, 206, respectively. If constructed in this manner, assembly 50 would operate less efficiently and require a greater electric signal to produce large enough magnetic fluxes to ensure that sufficient magnetic flux paths pass through axial gaps 122, 222 and that sufficient magnetic attraction between first movable member 115 and magnetic pole piece 130, and between second movable member 215 and magnetic pole piece 130, exists.

Finally, ferrule-shaped portions 181, 182, i.e., the portion of magnetic ring 180 which extends within first coil bore 106 and second coil bore 206 and between tube 185 and first and second bobbins 170, 270, respectively, increases efficiency of assembly 50 by directing the magnetic flux path along its intended path, but is not a necessary component of assembly 50. Similarly, first end piece 165 and second end piece 265 also extend partially within first coil bore 106 and second coil bore 206 at ferrule-shaped portions 166, 266, respectively, and increase efficiency of assembly 50. However, one of ordinary skill will realize that these extensions within the respective coil bores 106, 206 are also not necessary for proper operation of assembly 50.

As can also be seen in the embodiment shown in FIG. 1, there is first gap 175 between first end piece 165 and magnetic ring 180. The purpose of first gap 175 is to prevent the magnetic flux from simply passing from first end piece 165 to magnetic ring 180 and instead directs the magnetic flux across tube 185 to first movable member 115 and magnetic pole piece 130, creating the attractive force therebetween. Second gap 275 between second end piece 265 and magnetic ring 180 has a similar function: to prevent the magnetic flux from simply passing from second end piece 265 to magnetic ring 180 and instead directs the magnetic flux across tube 185 to second movable member 215 and magnetic pole piece 130, creating the attractive force therebetween. In the embodiment shown in FIG. 1, first gap 175 and second gap 275 are air gaps. However, in alternate embodiments, gaps 175, 275 could instead be solid, but made of a non-magnetic material such as stainless steel, brass, or ceramic, providing additional structural support. In addition, the thickness of tube 185 at gaps 175, 275 can be increased to at least partially fill first gap 175 and/or second gap 275.

Also in the embodiment shown in FIG. 1, tube 185 is a single non-magnetic tubular piece. This prevents the magnetic flux paths from passing through tube 185 without passing through first movable member 115 and magnetic pole piece 180 (in PWM portion 100) and through second movable member 215 and magnetic pole piece 180 (in on/off portion 200). In alternate embodiments, this same magnetic flux direction across tube 185 can be achieved in several ways. In a first alternate embodiment, tube 185 is made of a magnetic material and includes a non-magnetic "disruption," i.e., a non-magnetic spacer or gap generally at that portion of tube 185 within each coil bore. In another embodiment, tube 185 includes a relatively thin portion, generally within those portions of tube 185 that are within the coil bores, which rapidly saturates with magnetic flux when first coil 105 and second coil 205 are energized, becoming effectively non-magnetic. Additionally, tube 185 could be made of a magnetic material, but coated on the inside with Teflon™ or a lubricant that prevents first movable member 115 and second movable member 215 from magnetically sticking to tube 185. It is important to note that these alternate embodiments of tube 185 are not intended to be limited to only these alternate constructions, but also include those constructions which will be apparent to those of ordinary skill in the art, such that the magnetic flux is effectively directed across tube 185 and through first movable member 115 and second movable member 215, across first axial gap 122 and second axial gap 222, respectively, and through magnetic ring 180.

In the embodiment shown in FIG. 1, in which first end cap 125 is made of one piece, first end cap 125 is made of a non-magnetic material. Furthermore, in the embodiment in which end cap 125 further includes fluid entrance fitting 140 (i.e., the embodiment shown in FIG. 2), both components are made of a non-magnetic material as well. Similarly, in on/off portion 200, second end cap 250 is also made of a non-magnetic material. The reason that these pieces are non-magnetic is that if they were magnetic, there would be a magnetic attraction between first movable member 115 and first end cap 125 (in the one-piece embodiment, or between first movable member 115 and end first cap 125 and fluid entrance fitting 140 in a two-piece embodiment). The only effective axial attraction which first movable member 115 can have is with magnetic pole piece 180. Similarly, if second end cap 250 was magnetic, there would be a magnetic attraction between it and second movable member 215 which would interfere with the attractive force between second movable member 215 and magnetic pole piece 180.

First end piece 165 and second end piece 265 are made of a magnetic material to complete the magnetic flux paths generated by first coil 105 and second coil 205, respectively. However, assembly 50 can be constructed without first end piece 165 and/or second end piece 265. Such a construction would require the magnetic flux to travel between housing 110 and first movable member 115 or second movable member 215 through the air within assembly 50, thus requiring greater energy in order to function properly. Thus, the presence of first end piece 165 and second end piece 265 enable assembly 50 to operate with greater efficiency and provide structural support.

FIG. 1 shows an embodiment of assembly 50 which also includes housing 110. In this embodiment, housing 110 is also magnetic to complete the magnetic flux path around first coil 105 and around second coil 205. In alternate embodiments, assembly 50 does not include housing 110 or includes a non-magnetic housing 110. The magnetic flux paths must then travel through the air to complete the magnetic flux circuits. A stronger electrical signal is required, however, in order for assembly 50 to operate properly. In another embodiment of assembly 50 without a housing, a C-shaped electrical connector is used to complete each magnetic flux path, between first end piece 165 and magnetic ring 180 and between second end piece 265 and magnetic ring 180.

Magnetic pole piece 130, first movable member 115, second movable member 215, magnetic ring 180, first end piece 165, and second end piece 265 are, in one embodiment, magnetic iron. However, one of ordinary skill in the art will realize that they can be made of any magnetic material, and each need not be made of the same magnetic material within the same assembly 50. Furthermore, bobbin 171 is made of a non-magnetic material such as plastic (e.g., nylon) or any other non-magnetic material.

FIG. 1 shows PWM portion 100 in the open and de-energized state, and on/off portion 200 in the closed and de-energized state, with PWM portion 100 and on/off portion 200 having a fluid pathway therebetween. In the embodiment shown, the fluid pathway between PWM portion 100 and on/off portion 200 is magnetic pole piece bore 190. When a fluid enters assembly 50 at fluid entry port 141, the fluid passes through axial hole 142 and radial holes 143, fills chamber 145 (created by tube 185), surrounds first movable member 115, and passes through magnetic pole piece bore 190, through main bore 280 of second movable member 215, through bores 281, and into chamber 295, as shown by the arrows.

Figure 7A:
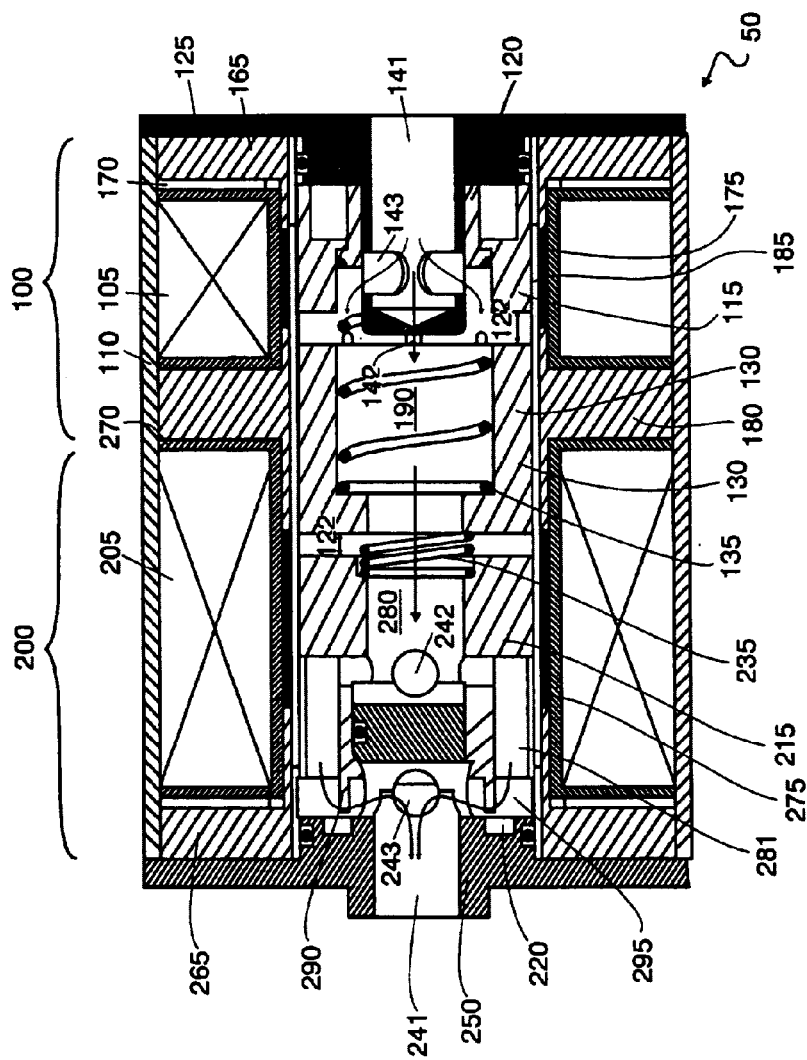
FIGS. 7a, 7b, 7c, and 7d show the first and second movable members in the open and closed positions.
Figure 7B:
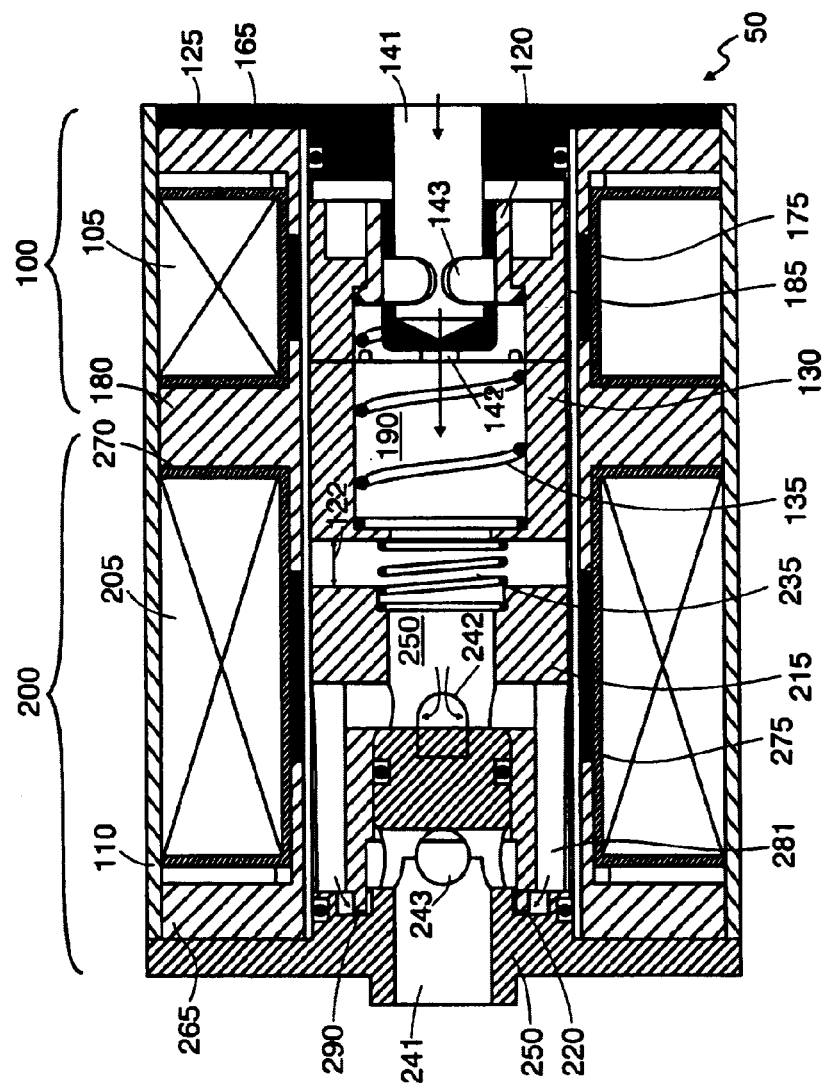

In the embodiment shown in FIG. 1, when first coil 105 is energized, the magnetic flux creates an attraction between first movable member 115 and magnetic pole piece 130 (as described supra). First movable member 115 overcomes the force exerted by first biasing member 135 and axially translates toward magnetic pole piece 130, covering radial holes 143. FIGS. 7a and 7b show one embodiment of first movable member 115 in the open (de-energized) and closed (energized) positions, respectively. Second movable member 215 is also shown in the open and closed states in FIGS. 7a and 7b, respectively. However, as can be seen, even when first movable member 115 covers radial holes 143, fluid still passes through axial hole 142, which is always open. Thus, there is always some minimum flow through PWM portion 100 of assembly 50. However, one of ordinary skill in the art will realize that radial holes 143 could also be situated on first end cap 125 (or on fluid entrance fitting 140 in a two-piece configuration) such that radial holes 143 are covered when first coil 105 is in the de-energized state and exposed when first coil 105 is energized. In addition, radial holes 143 could be configured so that they are never completely covered, such that the minimum flow flows through the portion of radial holes 143 that is always open, eliminating the need for, or in addition to, axial hole 142. Moreover, one of ordinary skill in the art will realize that the number of radial holes 143 and the number of radial holes 142 are not intended to be limiting. In the embodiment shown, there is one axial hole 142 and four radial holes 143, each oriented at 90° to one another.

PWM portion 100 can be operated proportionally by controlling the amount of time the valve is energized/closed as compared to the amount of time the valve is de-energized/open. FIG. 9a shows an example of an energy curve for the PWM portion of the valve assembly in which the PWM portion is subject to a pulse width modulated signal alternating between zero (0) volts and twenty four (24) volts. In the open/de-energized state, the solenoid coil is subject to 0V, and in the energized/closed state, 24 V. The example frequency is 50 Hz; that is, 50 cycles per second. Each cycle is the length of time in which the solenoid coil is energized ($t_1$) plus the length of time the solenoid is de-energized ($t_2$). The percent modulation (% M) is the percent of each cycle that the solenoid is energized and that the PWM portion is in the closed state, and can be represented by the following formula:

$$\% M = \frac{t_1}{(t_1 + t_2)} \times 100$$

The greater the percent modulation, the greater the amount of time the valve is energized. This linear relationship is graphically represented in FIG. 9b. By changing the percentage of time that the PWM valve is in the open and closed conditions, and the corresponding amount of time in which the solenoid is de-energized and energized within each cycle, respectively, proportionality can be achieved; though again, because of the one or more axial holes, there is always a minimum flow. Moreover, by changing the diameters of the axial hole(s) and of the radial hole(s), the minimum and maximum flow rates of the fluid through the PWM section can be controlled. One of ordinary skill in the art will realize that different diameters of the axial hole(s) and of the radial holes may be necessary for various applications and may even be necessary for fluids of different viscosities within the same application.

By pulsing the power to the solenoid coil in the PWM portion, energy consumption is reduced and the heat generated is minimized. Furthermore, in one embodiment of the PWM portion, the travel distance between the armature and the pole piece is designed to be small to allow the valve to respond quickly to the pulse-width-modulation changes to regulate the average flow rate.

Figure 7C:
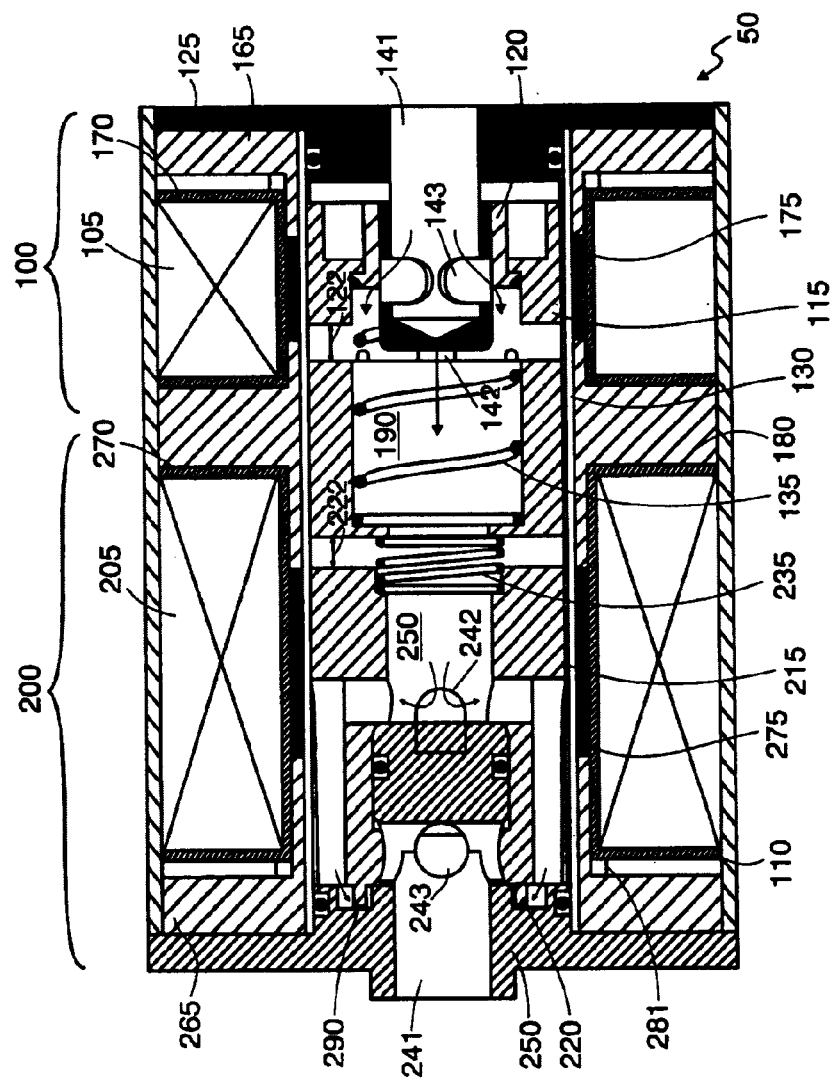

FIGS. 7a, 7b, 7c, and 7c show the movable members in the open and closed positions in one embodiment of assembly 50 in which first movable member 115 further includes movable member insert 120. In the embodiment of on/off portion 200 of assembly 50 shown in FIG. 1, FIG. 7c shows second coil 205 in the de-energized state and second movable member 215 in the closed position. First movable member 115 is in the open state. Second biasing member 235 between second movable member 215 and magnetic pole piece 130 holds second movable member 215 in the position shown in FIG. 7c when coil 205 is not energized. As can be appreciated, the fluid passes through and surrounds second movable member 215, except for that portion of second movable member 215 that is abutting molded seal 220. When in the closed position, the fluid is not allowed to pass between molded seal 220 and second movable member 215, i.e., the tight seal junction. In the embodiment shown molded seal 220 is part of end cap 250. Molded seal 220 can be made of rubber or another elastomeric material and is to ensure a tight fluid seal between second movable member 215 and second end cap 250.

Figure 7D:
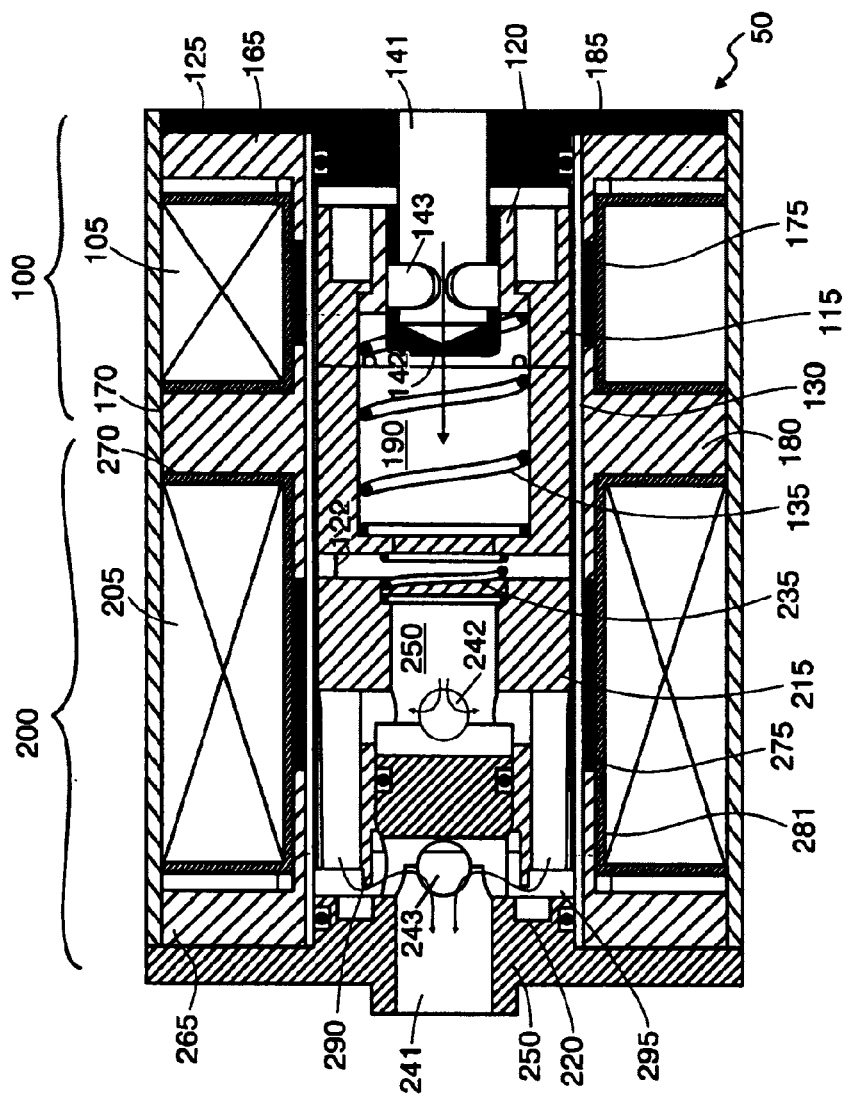

However, as can be seen in FIG. 7d, when second coil 205 is energized, a magnetic attraction is created between second movable member 215 and magnetic pole piece 130, causing second movable member 215 to axially translate toward magnetic pole piece 130, overcoming the force exerted by second biasing member 235, and creating a gap between second movable member 215 and molded seal 220. The fluid then passes from cavity 295 through this gap, through one or more passageways (visible in FIG. 8 as 282), through fluid passageway junction 243, and exits valve assembly 50 via fluid exit port 241. First movable member 115 is shown in the closed (energized) position in FIG. 8.

First movable member 115 is free-floating within chamber 145 except that first biasing member 135 holds first movable member 115 against first end cap 125 which allows the fluid to completely surround first movable member 115. Because the fluid surrounds first movable member 115, the net pressure exerted on first movable member 115 by the fluid is equal in all directions regardless of the fluid pressure, and the only force acting on armature 115 is biasing member 135. Assembly 50 of the instant application eliminates fluid pressure from hindering axial translation of first movable member 115, creating greater consistency as fluid pressure can change.

The pressure-balancing on second movable member 215 is similar and intended to have a similar effect on second movable member 215, i.e., eliminate (or reduce) the effect of the fluid pressure on second movable member 215. The radial forces acting downwards and upwards on second movable member 215, as situated, do not affect the axial translation as those forces cancel one another out and second movable member 215 (as with first movable member 115) does not move in a radial direction. Those forces will therefore not be discussed. However, because the portion of second movable member 215 pressed against molded seal 220 of second end cap 250 has no fluid at that surface when in the closed position, there is no force acting on second movable member 215 at that portion, and there is a greater force acting on second movable member 215 in the leftward direction than in the rightward direction (created by the fluid within cavity 295). The total leftward force that the fluid exerts on second movable member 215 is the fluid pressure multiplied by the surface area on the right side of second movable member 215 subject to the fluid pressure. The rightward force that the fluid exerts on second movable member 215 is the fluid pressure multiplied by the surface area of second movable member 215. The difference between the rightward force and the leftward force that the fluid exerts on second movable member 215, therefore, is the fluid pressure multiplied by the difference in surface areas, or that portion of second movable member 215 that is in contact with molded seal 220 of second end cap 250. Thus, the net force acting on second movable member 215 caused by the fluid and affecting axial translation, is an excess of the fluid pressure multiplied by the difference in the surface areas, in the leftward direction.

As explained with reference to first movable member 115 of PWM portion 100 supra, in a high-pressurized system, this force could be significant. Thus, when second coil 205 is energized, in order for on/off portion 200 to open, second movable member 215 must overcome both the force acting on it by second biasing member 235 as well as any force exerted by the fluid.

By reducing the thickness of annular portion 290 of second movable member 215, the effect of fluid pressure on on/off portion 200 of assembly 50 can be minimized. However, there will also be less surface of armature 215 abutting molded seal 220 preventing the fluid from exiting the valve assembly. Thus, one of ordinary skill in the art will appreciate that the thickness chosen for annular portion 290 of second movable member 215 that is in contact with molded seal 220 of end cap 250 when on/off portion 200 is in the closed position will depend on the pressure of the system, the fluid passing through the valve assembly, as well as other factors known to those of ordinary skill in the art.

Referring again to FIG. 1, second biasing member 235, in this embodiment, is a spring, though one of ordinary skill in the art will appreciate that alternative means for biasing second movable member 215 can be employed, such as an elastomeric material, a "star spring" with a memory, and a geo spring. Second movable member 215 has four side bores 281 set at approximately 90° from one another relative to axis A. One of ordinary skill in the art will recognize that other suitable configurations for a bore or an array of bores could be used to facilitate fluid flow. To illustrate the embodiment of side bores 281, FIG. 1 shows broken lines passing though second movable member 215, though in this embodiment, second movable member 215 is otherwise substantially solid. The diameters of main bore 280 and side bores 281 determine the flow rate of the fluid through second movable member 215. Side bores 281 can also be appreciated in FIG. 4.

The embodiment in FIG. 1 of on/off portion 200 is also comprised of molded seal 220, end cap 250, fluid exit port 241, and fluid passageway junctions 242 and 243. Molded seal 220 and annular portion 290 of second movable member 215 create a tight seal junction. The fluid that exits PWM portion 100 passes through magnetic pole piece bore 190 and main bore 280 of second movable member 215. Fluid passageway junction 242 connects main bore 280 of second movable member 215 to side bores 281 which allows the fluid to pass through second movable member 215 to cavity 295 within on/off portion 200 between end cap 250 and armature 215.

While the drawings depict the device being used in a valve assembly, it is intended, and the reader will recognize, that the device can be used in alternate applications. For example, rather than movable members 115, 215 translating to allow and restrict fluid flow through the device, movable members 115, 215 could also be connected or coupled to a cable or a lever to control their respective movements. In these applications, end caps 125, 250 would not include fluid entry port 141 or fluid exit port 241, respectively, but instead would include a means of attachment to a cable, lever, or the like.

Although, for convenience, the invention has been described primarily with reference to several specific embodiments, it will be apparent to those of ordinary skill in the art that the valve and the components thereof can be modified without departing from the spirit and scope of the invention as claimed.

The invention claimed is:

1. A device comprised of:
   a first coil with a first bore therethrough, producing a first magnetic flux when subject to a first electric signal, and a first magnetic flux path associated therewith;
   a second coil with a second bore therethrough, producing a second magnetic flux when subject to a second electric signal, and a second magnetic flux path associated therewith;
   a tube extending through said first bore of said first coil and said second bore of said second coil;
   a magnetic pole piece within said tube and placed generally between said first bore and said second bore;
   a magnetic ring set outside said tube and generally between said coils;
   a first end cap magnetically adjacent to said first coil and adapted to form a fluid inlet port;
   a second end cap magnetically adjacent to said second coil and adapted to form a fluid outlet port;
   a first axially translatable movable member disposed within said tube and generally between said first end piece and said magnetic pole piece;

a first biasing mechanism disposed within said tube and between said magnetic pole piece and said first movable member, wherein said first biasing mechanism is adapted to exert a first force on said first movable member towards said first end cap;

a second axially translatable movable member disposed within said tube and generally between said second end piece and said magnetic pole piece; and a second biasing mechanism disposed within said tube and between said magnetic pole piece and said second movable member, wherein said second biasing mechanism is adapted to exert a second force on said second movable member towards said second end cap;

wherein said magnetic flux path of said first coil and said magnetic flux path of said second coil share said magnetic pole piece and said magnetic ring to complete their respective magnetic flux paths, and wherein said first movable member axially translates towards said magnetic pole piece in the presence of said first magnetic flux and said second movable member axially translates towards said magnetic pole piece in the presence of said second magnetic flux.

2. The device of claim 1, wherein said first coil is wound on a first non-magnetic bobbin and said second coil is wound on a second non-magnetic bobbin.

3. The device of claim 1, wherein said magnetic pole piece, said magnetic ring, said first axially translatable movable member, and said second axially translatable movable member are made of a magnetic material selected from a group comprised magnetic iron.

4. The device of claim 1, wherein said device is further comprised of a housing substantially enclosing said first coil, said second coil, said tube, said magnetic pole piece, said magnetic ring, said first end cap, said second end cap, said first axially translatable movable member, said first biasing mechanism, said second axially translatable movable member, and said second biasing mechanism.

5. The device of claim 1, further including a first end piece positioned between said first end cap and said first coil, outside of said tube, and a second end piece positioned between said second end cap and said second coil, outside of said tube.

6. The device of claim 5, wherein said first end piece is further comprised of a first ferrule-shaped portion extending between said first coil and said tube, wherein said magnetic ring is further comprised of a second ferrule-shaped portion extending between said first coil and said tube and a third ferrule-shaped portion extending between said second coil and said tube, and said second end piece is further comprised of a fourth ferrule-shaped portion extending between said second coil and said tube, wherein said first ferrule-shaped portion and said second ferrule-shaped portion form a first gap therebetween and said third ferrule-shaped portion and said fourth ferrule-shaped portion form a second gap therebetween.

7. The device of claim 6, further comprised of a first non-magnetic spacer positioned within said first gap and a second non-magnetic spacer positioned within said second gap.

8. The device of claim 1, wherein said device is further comprised of a C-shaped electrical connector to complete said first magnetic flux path and said second magnetic flux path.

9. The device of claim 1, wherein said tube is made of a non-magnetic material.

10. The device of claim 1, wherein said tube is made of a magnetic material and further comprised of a non-magnetic disruption.

11. The device of claim 1, wherein said first end cap forms an axial hole and at least one radial hole.

12. The device of claim 1, wherein said first end cap is further comprised of a generally centered aperture and a fluid entrance fitting disposed with said aperture, said fluid entrance fitting defining said fluid entry port, an axial hole, and at least one radial hole.

13. The device of claim 1, wherein said first electric signal is a pulse width modulated signal and said second electric signal is a second pulse width modulated signal.

14. The device of claim 13, wherein flow of a fluid through said device is within a range of a maximum flow and a minimum flow determined by controlling a portion of time in which said first coil is subject to said first pulse width modulated signal and a portion of time in which said second coil is subject to said second pulse width modulated signal.

15. The device of claim 1, wherein said first axially translatable movable member is further comprised of a movable member insert, said movable member insert being made of a material selected from a group comprising a plastic, a nylon, a Teflon, and a fluorocarbon.

16. The device of claim 1, wherein said first axially translatable movable member is pressure-balanced.

17. The device of claim 1, wherein said first biasing mechanism is selected from a group comprised of a spring, a flexible tube, a star spring with a memory, a sponge, a geo-spring, a fluid pressure, and gravity.

18. The device of claim 1, wherein said device is further comprised of a first fluid sealing member disposed between said first end cap and said tube to prevent a fluid from leaking from said device, said first fluid sealing member being selected from a group comprised of at least one O-ring, a plumber's tape, a silicone, a sealing material, and a weld.

19. The device of claim 1, wherein said device is further comprised of a second fluid sealing member disposed between said second end cap and said tube to prevent a fluid from leaking from said device, said second fluid sealing member being selected from a group comprised of at least one O-ring, a plumber's tape, a silicone, a sealing material, and a weld.

20. The device of claim 1, wherein said second axially translatable movable member is further comprised of an annular portion and said second end cap is further comprised of a molded seal disposed thereon, said annular ring and said molded seal forming said tight seal junction therebetween when in contact with one another.

21. The device of claim 20, wherein said molded seal is made of an elastomeric material.

22. The device of claim 1, wherein said second axially translatable movable member is further comprised of a molded seal and said second end cap is further comprised of an annular portion which abuts said molded seal of said second movable member, said molded seal of said second movable member and said annular portion of said second end cap forming a tight seal junction therebetween when in contact with one another.

23. The device of claim 1, wherein said second axially translatable movable member is substantially pressure-balanced.

24. An actuator assembly comprised of:
a first coil with a first bore therethrough, a first magnetic flux, and a first magnetic flux path associated therewith;

a second coil with a second bore therethrough, a second magnetic flux, and a second magnetic flux path associated therewith;

a tube extending through said first bore of said first coil and said second bore of said second coil;

a magnetic pole piece within said tube and placed generally between said first bore and said second bore;

a magnetic ring set outside said tube and generally between said coils;

a first end cap magnetically adjacent to said first coil;

a second end cap magnetically adjacent to said second coil;

a first axially translatable movable member disposed within said tube and generally between said first end piece and said magnetic pole piece, forming a first axial gap between said first axially translatable movable member and said magnetic pole piece and wherein said first magnetic flux creates an attraction between said magnetic pole piece and said first movable member, such that said first movable member translates from a first position to a second position;

a first biasing mechanism disposed within said tube and between said magnetic pole piece and said first movable member, wherein said first biasing mechanism is adapted to exert a first force on said first movable member towards said first end cap;

a second axially translatable movable member disposed within said tube and generally between said second end piece and said magnetic pole piece, and forming a second axial gap between said second axially translatable movable member and said magnetic pole piece and wherein said second magnetic flux creates an attraction between said magnetic pole piece and said second movable member, such that said second movable member translates from a first position to a second position; and a second biasing mechanism disposed within said tube and between said magnetic pole piece and said second movable member, wherein said second biasing mechanism is adapted to exert a second force on said second movable member towards said second end cap;

wherein said magnetic flux path of said first coil and said magnetic flux path of said second coil share said magnetic pole piece and said magnetic ring to complete their respective magnetic paths, and wherein said first movable member axially translates towards said magnetic pole piece in the presence of said first magnetic flux and said second movable member axially translates towards said magnetic pole piece in the presence of said second magnetic flux.

25. The actuator assembly of claim 24, wherein said first coil is wound on a first non-magnetic bobbin and said second coil is wound on a second non-magnetic bobbin.

26. The actuator assembly of claim 24, wherein said magnetic pole piece, said magnetic ring, said first axially translatable movable member, and said second axially translatable movable member are made of a magnetic material selected from a group comprised magnetic iron.

27. The actuator assembly of claim 24, wherein said actuator assembly is further comprised of a housing substantially enclosing said first coil, said second coil, said tube, said magnetic pole piece, said magnetic ring, said first end cap, said second end cap, said first axially translatable movable member, said first biasing mechanism, said second axially translatable movable member, and said second biasing mechanism.

28. The actuator assembly of claim 24, further including a first end piece positioned between said first end cap and said first coil, outside of said tube, and a second end piece positioned between said second end cap and said second coil, outside of said tube.

29. The actuator assembly of claim 28, wherein said first end piece is further comprised of a first ferrule-shaped portion extending between said first coil and said tube, wherein said magnetic ring is further comprised of a second ferrule-shaped portion extending between said first coil and said tube and a third ferrule-shaped portion extending between said second coil and said tube, and said second end piece is further comprised of a fourth ferrule-shaped portion extending between said second coil and said tube, wherein said first ferrule-shaped portion and said second ferrule-shaped portion form a first gap therebetween and said third ferrule-shaped portion and said fourth ferrule-shaped portion form a second gap therebetween.

30. The actuator assembly of claim 29, further comprised of a first non-magnetic spacer positioned within said first gap and a second non-magnetic spacer positioned within said second gap.

31. The actuator assembly of claim 24, wherein said actuator assembly is further comprised of a C-shaped electrical connector to complete said first magnetic flux path and said second magnetic flux path.

32. The actuator assembly of claim 27, wherein said tube is made of a non-magnetic material.

33. The actuator assembly of claim 24, wherein said tube is made of a magnetic material and further comprised of a non-magnetic disruption.

34. The actuator assembly of claim 24, wherein said first end cap is adapted to firm a fluid entry port comprised of an axial hole and at least one radial hole.

35. The actuator assembly of claim 34, wherein said first end cap is further comprised of a generally centered aperture and a fluid entrance fitting disposed with said aperture, said fluid entrance fitting defining said fluid entry port, an axial hole, and at least one radial hole.

36. The actuator assembly of claim 24, wherein said first end cap and said second end cap are each substantially solid and adapted to be connected to a lever or a cable.

37. The actuator assembly of claim 24, wherein said first electric signal is a first pulse width modulated signal and said second electric signal is a second pulse width modulated signal.

38. The actuator assembly of claim 37, wherein flow of a fluid through said actuator assembly is within a range of a maximum flow and a minimum flow determined by controlling a portion of time in which said first coil is subject to said first pulse width modulated signal and a portion of time in which said second coil is subject to said second pulse width modulated signal.

39. The actuator assembly of claim 24, wherein said first axially translatable movable member is further comprised of a movable member insert.

40. The actuator assembly of claim 39, wherein said movable member insert is made of a material selected from a group comprising a plastic, a nylon, a Teflon, and a fluorocarbon.

41. The actuator assembly of claim 40, wherein said first axially translatable movable member is pressure-balanced.

42. The actuator assembly of claim 24, wherein said first biasing mechanism is selected from a group comprised of a spring, a flexible tube, a star spring with a memory, a sponge, a geo-spring, a fluid pressure, and gravity.

43. The actuator assembly of claim 24, wherein said actuator assembly is further comprised of a first fluid sealing member disposed between said first end cap and said tube to prevent a fluid from leaking from said actuator assembly, said first fluid sealing member being selected from a group comprised of at least one O-ring, a plumber's tape, a silicone, a sealing material, and a weld.

44. The actuator assembly of claim 24, wherein said actuator assembly is further comprised of a second fluid sealing member disposed between said second end cap and said tube to prevent a fluid from leaking from said actuator assembly, said second fluid sealing member being selected from a group comprised of at least one O-ring, a plumber's tape, a silicone, a sealing material, and a weld.

45. The actuator assembly of claim 24, wherein said second axially translatable movable member is further comprised of an annular portion and said second end cap is further comprised of a molded seal disposed thereon, said annular ring and said molded seal forming said tight seal junction therebetween when in contact with one another, and said molded seal being made of an elastomeric material.

46. The actuator assembly of claim 24, wherein said second axially translatable movable member is further comprised of a molded seal and said second end cap is further comprised of an annular portion which abuts said molded seal of said second movable member, said molded seal of said second movable member and said annular portion of said second end cap forming a tight seal junction therebetween when in contact with one another.

47. The actuator assembly of claim 24, wherein said second axially translatable movable member is substantially pressure-balanced.

* * * * *